Aug. 10, 1937.   F. M. CLARK ET AL   2,089,686
HIGH RESISTANCE ELECTROLYTE
Filed Dec. 10, 1935
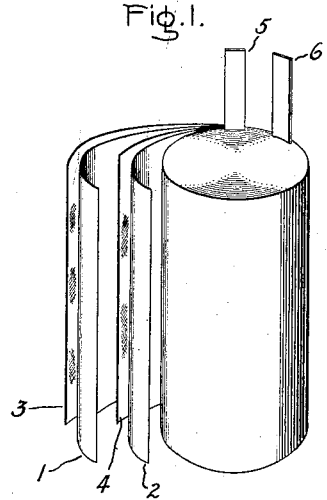
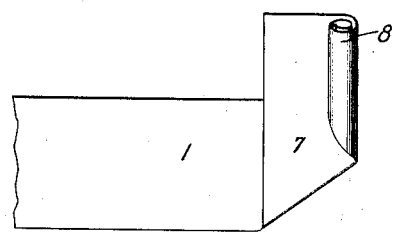
Inventors:
Frank M. Clark,
Goldner F. Lipsey,
by Harry E. Dunham
Their Attorney.

Patented Aug. 10, 1937

2,089,686

UNITED STATES PATENT OFFICE 2,089,686

HIGH RESISTANCE ELECTROLYTE

Frank M. Clark and Goldner F. Lipsey, Pittsfield, Mass., assignors to General Electric Company, a corporation of New York Application December 10, 1935, Serial No. 53,751

17 Claims. (Cl. 175—315)

The present invention comprises an improved electrolyte for electrolytic devices, such for example, as rectifiers and capacitors.

In U. S. Patent No. 2,022,500 issued Nov. 26, 1935 to Clark and Koenig and being assigned to the same assignee as the present application, various new electrolytic compositions are described, termed "cryohydric electrolytes", comprising mixtures of salts, which are liquid or semi-liquid at temperatures lower than the liquefying temperature of their lowest melting constituent. One of the electrolyte ingredients is a film-forming ionogen, such for example, as ammonium borate or phosphate.

The electrolytes described in said prior patent have electrical resistivities, in general less than 100 ohms per cm³ at 90° C. and therefore are not well adapted for use in devices intended for operation with impressed voltages higher than about 300 volts direct current.

The present invention comprises improved electrolytes having higher electrical resistivities and being adapted particularly for operation in electrolytic capacitors, or other electrolytic devices operating at direct current voltages over 300 volts and ordinarily at 400 to 600 volts or higher. In such new electrolytes, higher resistivity is obtained in accordance with the present invention by including therein as an ingredient an organic fatty acid containing more than five carbon atoms, such acid being characterized by a resistivity greater than $1 \times 10^6$ ohms per centimeter cube at 90° C. The high resistance acid is associated with one or more organic acids of lower resistivity in such proportion that the resultant electrical resistivity of the mixture falls within the limits of about 100 to 600 ohms per centimeter cube at 90° C. We prefer to employ as the resistance-modifying agent water-insoluble fatty oil acids, such as oleic acid, stearic acid, palmitic acid, linoleic acid, linolenic acid, and the like.

The accompanying drawing shows in perspective in Fig. 1 a capacitor assembly and in Fig. 2 a terminal for a capacitor armature.

In carrying out the production of ammoniated electrolytes embodying the present invention, we may proceed as stated in the above prior patent producing a mixture of salts by neutralizing with ammonia a mixture of suitable acids.

In combination with an inorganic acid such as boric acid or phosphoric acid, there is used as a second acid component a water-soluble mono-carboxylic organic acid of the aliphatic acid series, the molecular structure of which contains less than five carbon atoms, for example, acetic acid, propionic acid, butyric acid, lactic acid, or suitable mixtures of such acids. For example, one part of boric acid is suspended in 1.77 parts of glacial acetic acid and ammonia gas is introduced into the mixture, the resulting reaction causing heating which preferably is reduced by artificial cooling to limit the temperature to about 100 to 110° C. The introduction of the ammonia gas into the acid solution results in the formation of ammonium borate (or phosphate, as the case may be) and ammonium acetate. The reaction preferably is stopped when the pH value is in the range of about 6.5 to 7.5. The ammoniated product is a thin turbid liquid at 100° C. and a creamy mass at room temperature.

To the product of this reaction, or its equivalent otherwise produced there is added a suitable high resistance fatty acid, the specific amount of high resistance fatty acid being chosen to produce the desired electrical resistivity. Ordinarily about 20 to 50 per cent may be added. For example, when the cryohydric electrolyte is intended for use in an electrical capacitor to be used on a 500 volt direct current circuit, the preferred resistivity of the mixture should be between 300 and 500 ohms per cm³ at 90° C.

If desired, the resistivity can be further adjusted by conducting ammonia gas into the mixture after the fatty acid has been added. The introduction of ammonia at this point results in the formation of an ammonium compound of the fatty acid, the passage of the ammonia gas being conducted to an end point at which the desired electrical resistivity is obtained.

As an alternative, there may be added to the reaction product resulting from the passage of ammonia gas into the mixture of boric acid and acetic acid, a suitable amount of ammonium compound of a chosen fatty acid. In the appended claims the term "fatty acid composition" has been used to cover either the uncombined acid or a compound thereof.

It is also possible to prepare the product of the present invention by introducing the desired high resistivity fatty oil acid into the initial reaction mixture of acids, that is, associating it in the case of the above example with boric acid and the acetic acid and then passing ammonia gas into the composition containing the high resistance fatty oil acid until a desired electrical resistivity is obtained in the product.

A mixture containing from 10 to 33% stearic acid, 57 to 34% acetic acid, and 33% boric acid may be treated with ammonia gas to a pH value of 6.5 to 7.5. Upon treatment of a mixture consisting of 10% stearic acid, 57% acetic acid and 33% boric acid to a pH value in the range of 6.5 to 7.5, a product is obtained which is a clear amber solution at 100° C. and a hard white solid at 25° C., the softening point being in the range of 65 to 70° C. When a mixture containing 33% stearic acid, 33% acetic acid and 34% boric acid is treated with ammonia gas to a pH value in the range of 6.5 to 7.5, a salvy or lard-like solid at 25° C. is obtained which even at 100° C. constitutes a thick paste. The exact percentage of stearic acid in the mixture before being treated with ammonia gas is determined by the resistance characteristics desired in the electrolyte product.

The use of stearic acid as the high resistance ingredient results in the formation of nearly solid electrolyte within the operating temperature range at which electrolytic capacitors are normally subjected. This range ordinarily is lower than about 55 to 60° C.

The use of oleic acid as the high resistance ingredient results in a more liquid electrolyte. The solid or semi-solid type of electrolyte in many instances may be preferred. When, therefore, oleic acid or other liquid acid is used as the high resistance ingredient, it has been found desirable to incorporate a bodying agent in order to produce a substantially solid electrolyte product. For example, a suitable solid electrolyte may be prepared by incorporating aluminum stearate in an amount ranging from 25 to 50% of the oleic acid, or other liquid high resistance agent used. The resulting product is a lard-like mass at 25° C. and is characterized by a softening point in the range of 35 to 50° C. depending on the exact amount of aluminum stearate used.

In place of aluminum stearate other bodying agents may be used as for example, aluminum, sodium, calcium, or potassium soaps or salts of stearic, oleic or palmitic acids.

Such bodying agents in general are used in an amount equal to 25 to 50% of the high resistance fatty acid.

The capacitor assembly shown in Fig. 1 (the container being omitted), comprises armatures (or electrodes) 1 and 2 wound on themselves as a roll, the armatures being separated by absorbent spacers 3, 4 consisting of suitable porous material, such as cheesecloth. The armatures consist of thin metal foil at least one of the armatures (the anode) being made of film-forming material, such as aluminum. The film-forming electrode should be pre-oxidized by electrolytic treatment in an aqueous solution of boric acid and sodium tetraborate.

The pre-oxidation of the anode foil is conveniently carried out in steps, the foil passing through three oxidizing baths arranged in series. Each bath consists of an aqueous solution of boric acid and borax the resistance of which is varied in order to prevent sparking with resulant destruction of the filmed foil. A suitable arrangement of baths is as follows:

| | Boric acid per liter of solution | Borax per liter of solution | Resistance at 90° C. in ohms/cm³ | pH |
|---|---|---|---|---|
| | Grams | | | |
| Bath 1 | 64 | 12 | 650 to 700 | 4.8 to 5.0 |
| Bath 2 | 64 | 10 | 765 to 825 | 4.8 to 5.0 |
| Bath 3 | 64 | 8 | 920 to 960 | 4.7 to 4.9 |

The pre-oxidation of the foil is best carried out at about 95° C. under a direct current voltage which varies with the desired rated voltage of the capacitor. Thus for a capacitor rated at 450 volts direct current a suitable oxidation voltage is 575 volts direct current. For the use of higher oxidation voltages the oxidizing electrolyte used must be modified by decreasing the borax content in order to obtain suitably higher resistances. Thus for an oxidation voltage of 650 volts the oxidizing baths should have a resistance of 1250, 1500 and 1900 ohms per centimeter cube respectively at 90° C.

In assembling the capacitor, the pre-oxidized anode foil is spaced from the cathode armature by means of cheesecloth or other suitable absorbent spacer. The capacitor may be arranged in stacked pads or in roll construction as illustrated.

Current terminals are provided for the armatures as indicated at 5 and 6. As shown in Fig. 2, a terminal may be made by folding one end of a foil strip, as shown at 7, and rolling or folding the same as shown at 8.

Capacitors embodying our invention are particularly suitable for use on direct current circuits. Such capacitors suitable for use at 450 to 500 volts have a capacity corresponding to one microfarad for each fifteen square inches of active anode area.

For example, a capacitor with two flat plate electrodes, the anode being four inches long and three and three-quarter inches wide and having been pre-oxidized at 575 volts direct current will give one microfarad capacity at 25° C.

The equivalent series resistance R of a capacitor is a factor of the power factor formula:

PF (power factor)$=2\pi FCR$ (F being frequency and C capacity in farads)

or $$R = \frac{PF}{2\pi FC}$$

In capacitors embodying our invention, this factor R is relatively low, being within a range of 15 to 40.

What we claim as new and desire to secure by Letters Patent of the United States is:

1. An electrolytic device containing an electrolyte comprising a film-forming ionogen, an organic acid composition having an electrical resistivity greater than $1 \times 10^6$ ohms per centimeter cube at 90° C. and an organic acid containing less than five carbon atoms and having a resistivity less than $1 \times 10^6$ ohms per centimeter cube at 90° C. said ingredients being combined in such proportion that the resultant resistivity of the electrolyte is within a range of about 100 to 600 ohms per centimeter cube measured at 90° C. and at 1000 cycles.

2. An electrolytic device containing an ammoniated electrolyte, the acid components of which comprise boric acid, a monobasic aliphatic acid having less than five carbon atoms in the molecule and a fatty acid having more than five carbon atoms in the molecule, the electrical resistivity of said electrolyte being within a range of about 100 to 600 ohms per centimeter cube measured at 90° C. and at 1000 cycles.

3. An electrolytic capacitor comprising the combination of armatures, at least one of which is film-forming and an electrolyte comprising mixed ammonium compounds of boric acid, acetic acid and a fatty acid containing more than five carbon atoms in its molecule.

4. An electrolytic capacitor comprising the combination of cooperating armatures at least one of which is film-forming, an interposed porous spacer and an electrolyte permeating said spacer, said electrolyte consisting of a mixture of ammonium compounds of boric, acetic and oleic acids, said electrolyte having an electrical resistivity in a range of about 100 to 600 ohms per centimeter cube measured at 90° C. and at 1000 cycles.

5. An electrolyte suitable for use in electrolytic devices comprising a mixture of a film-forming ionogen, an ammonium compound of a monobasic aliphatic acid having less than five carbon atoms in the molecule, and a compound of a monobasic aliphatic acid having more than five carbon atoms in the molecule, said electrolyte having an electrical resistivity within a range of about 100 to 600 ohms per centimeter cube measured at 90° C. and at 1000 cycles.

6. A mixture suitable for use in capacitors comprising a substantial amount respectively of ammonium compounds of boric acid, acetic acid and oleic acid.

7. An electrolyte suitable for use in electrolytic devices comprising a substantial proportion respectively of the ammonium compounds of boric acid, acetic acid and oleic acid, and a substantial amount of aluminum stearate.

8. An electrolyte suitable for use in electrolytic devices comprising a substantial proportion respectively of the ammonium compounds of boric acid, acetic acid and oleic acid, and a substantial amount of a bodying agent.

9. A mixture suitable for use in capacitors comprising a substantial amount respectively of ammonium compounds of an inorganic acid, an aliphatic acid containing less than five carbon atoms and stearic acid.

10. A mixture suitable for use in capacitors comprising a substantial amount respectively of ammonium compounds of an inorganic acid, an aliphatic acid containing less than five carbon atoms and stearic acid, said mixture having a resistivity in the range of about 100 to 600 ohms per centimeter cube measured at 90° C. and at 1000 cycles and a melting point in a range of about 40 to 60° C.

11. A cryohydric electrolyte suitable for use in film-forming capacitors comprising a film-forming ionogen and containing also at least about 20 per cent of an ammoniated water-insoluble acid having more than five carbon atoms in the molecule.

12. A cryohydric electrolyte suitable for use in film-forming capacitors comprising a mixture of substantial amounts of ammonium compounds of boric and acetic acids and about 20 to 50 per cent of a monobasic fatty acid having more than five carbon atoms in the molecule.

13. An electrolyte suitable for use with film-forming electrodes which consists of substantial proportions respectively of a film-forming ionogen, an ammonium compound of an aliphatic acid having less than five carbons in the molecule and an ammonium compound of fatty oil acid having more than five carbons in the molecule.

14. An electrolyte suitable for use with film-forming electrodes which consists of substantial proportions respectively of inorganic film-forming ionogen, an ammoniated compound of an acid of the group consisting of acetic, propionic, butyric and lactic acids and an ammoniated compound of a fatty oil acid of the group consisting of oleic, stearic, palmitic, linoleic, and linolenic acids.

15. An electrolyte suitable for use with film-forming electrodes containing a basic component and an acid component chemically in combination, the acid component comprising boric acid, a monocarboxylic aliphatic acid having less than five carbon atoms in the molecule and a fatty oil acid.

16. A solid or semi-solid electrolyte suitable for use with film-forming electrodes containing ammonia and an acid component in chemical combination, the acid component comprising boric acid, a monocarboxylic aliphatic acid having less than five carbon atoms in the molecule, and a fatty oil acid.

17. A substantially solid electrolyte suitable for use with film-forming electrodes comprising substantial proportions respectively of a film-forming ionogen, an acid of the group consisting of acetic, propionic, butyric and lactic acids, an ammonium compound of a fatty oil acid having more than five carbon atoms in the molecule and a bodying agent comprising a soap.

FRANK M. CLARK.
GOLDNER F. LIPSEY.